(12) United States Patent
Vanghi

(10) Patent No.: US 6,393,276 B1
(45) Date of Patent: May 21, 2002

(54) MOBILE STATION ASSISTED FORWARD LINK OPEN LOOP POWER AND RATE CONTROL IN A CDMA SYSTEM

(75) Inventor: Vieri Vanghi, San Diego, CA (US)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/481,948

(22) Filed: Jan. 12, 2000

(51) Int. Cl.[7] ............................................... H04B 7/005
(52) U.S. Cl. .................. 455/422; 455/436; 455/522; 455/68; 455/69; 370/332; 370/335; 370/331; 370/248; 370/252
(58) Field of Search .............................. 455/522, 437, 455/69, 422, 436, 68; 370/332, 311, 248, 252, 328, 329, 335, 331

(56) References Cited

U.S. PATENT DOCUMENTS

| | | | |
|---|---|---|---|
| 5,893,035 A | * 4/1999 | Chen | 455/522 |
| 5,999,816 A | * 12/1999 | Tiedemann, Jr. et al. | 455/437 |
| 6,058,107 A | * 5/2000 | Love et al. | 370/332 |
| 6,073,025 A | * 6/2000 | Chheda et al. | 455/522 |
| 6,154,450 A | * 12/2000 | Wallentin et al. | 370/311 |
| 6,154,659 A | * 12/2000 | Jalali et al. | 455/522 |
| 6,160,999 A | * 12/2000 | Chheda et al. | 455/69 |
| 6,253,085 B1 | * 6/2001 | Bender | 455/442 |
| 6,298,241 B1 | * 10/2001 | Hong | 455/522 |
| 6,304,562 B1 | * 10/2001 | Kim et al. | 370/332 |

FOREIGN PATENT DOCUMENTS

EP  0977371 A2  * 7/1999  ............ H04B/7/005

* cited by examiner

*Primary Examiner*—Daniel Hunter
*Assistant Examiner*—Andrew Harry
(74) *Attorney, Agent, or Firm*—Coats & Bennett, P.L.L.C.

(57) ABSTRACT

In a CDMA system, forward link load measurements and mobile station channel measurements are provided to the base station controller to allow the controller to jointly select the initial traffic channel transmit power and data rate. A mobile station reports a received pilot channel signal-to-noise ratio for all base stations in sight to a base station controller. The base stations report a current forward link load estimate to the base station controller. The base station controller sets a number of traffic channel connections and a traffic channel data rate to be allocated for the traffic channel connections, and sets a target traffic channel signal-to-noise ratio based on the data rate and the number of traffic channel connections. The initial traffic channel power is computed by the controller based on estimated forward link channel characteristics, the target traffic channel received signal-to-noise ratio, the base stations' load, the number of traffic channel connections, and the traffic channel data rate.

12 Claims, 4 Drawing Sheets

MOBILE STATION ASSISTED FORWARD LINK OPEN LOOP POWER AND RATE CONTROL IN A CDMA SYSTEM

FIELD OF THE INVENTION

The present invention relates generally to radio or wireless communications and, more particularly, relates to a method and apparatus for setting the initial transmit power and data rate in the forward link of a code division multiple access (CDMA) wireless communications system.

BACKGROUND OF THE INVENTION

In conventional CDMA systems, forward link (base station to mobile station) transmit power and data rate control is a base station function that is activated each time one or multiple traffic connections are established. The traffic channel data rate and the traffic channel transmit power are selected such that (1) the base station forward link residual capacity does not dip below a desired threshold; and (2) the desired received traffic channel signal-to-noise ratio is approximately achieved at the mobile station antenna connector. Closed loop power control is then used to adjust the traffic channel transmit power and to compensate for suboptimum open loop estimation and changing channel conditions.

Conventional approaches treat traffic channel data rate and power control separately and in a heuristic fashion. With regard to power control, the initial forward link traffic channel transmit power is set to a default value at call setup and during hard handoff. If this default value is set too low, the mobile station traffic channel received signal-to-noise ratio will be insufficient to guarantee a reliable traffic channel connection, which may result in a call being dropped or in service quality degradation. For this reason, the default value is usually set at a higher level than is required on average in order to provide a reliable connection even in the worst or near-worst case channel conditions.

This approach to power control has several shortcomings. By setting the initial traffic channel transmit power to a high default level, the mobile station traffic channel received signal-to-noise ratio will frequently exceed the required level and forward rink capacity will be unnecessarily consumed. Moreover, a high default value increases the total transmit power peak to average ratio, leading to inefficient use of the base station high power amplifier. Where multiple traffic channel connections must be established nearly simultaneously, and where high rate data users consume a significant amount of the total forward link capacity, the transmit power peak to average ratio increases. A reduction in the maximum average nominal transmit power may be required to avoid damage to the base station high power amplifier and/or short term operation in the non-linear region of the high power amplifier, which may lead to increased spurious emission levels. Reducing the maximum average nominal transmit power, however, reduces the efficiency of the amplifier.

The transmit data rate is chosen based on the service option to be connected and on the base station residual forward link (base station to mobile station) capacity. This approach to setting the data rate is also problematic. If the selected data rate is too high for a given initial traffic channel transmit power and residual forward link capacity, the mobile station may not be able to acquire the forward link traffic channel. If the traffic channel is acquired, the power allocated to the traffic channel may exceed the residual forward link capacity and thereby cause overload.

SUMMARY OF THE INVENTION

The present invention uses forward link load measurements and mobile station channel measurements to allow the base station to jointly select the initial traffic channel transmit power and data rate. Using this approach, the mobile station can reliably acquire the forward link, forward link capacity consumption is minimized, base station total transmit power peak to average ratio is reduced, and the power allocated to the traffic channel is no more than the residual forward link capacity.

In one embodiment of the invention, a CDMA wireless communications system that controls the initial power and data rate settings during forward link establishment of a traffic channel is provided. The system comprises a base station controller, one or more base stations that report a current forward link load estimate to the base station controller, and a mobile station that reports a received pilot channel signal-to-noise ratio to the base station controller. The base station controller sets the number of traffic channel connections and the data rate to be allocated for the traffic channel connections. The base station controller also sets a target traffic channel signal-to-noise ratio based on the data rate and the number of traffic channel connections, and computes the initial traffic channel power based on estimated forward link channel characteristics, the target traffic channel received signal-to-noise ratio, the base stations' load, the number of traffic channel connections, and the traffic channel data rate.

The present invention also provides a method for forward link open loop power and rate control in a CDMA system. The method comprises the following steps:

(a) a mobile station reports a received pilot channel signal-to-noise ratio, $$\text{Pilot}\frac{E_c}{I_o},$$

for all base stations in sight to a base station controller;

(b) the base stations report a current forward link load estimate, $$\frac{\text{Pilot}\,E_c}{I_{or}},$$

to the base station controller;

(c) the base station controller sets a number of traffic, channel connections, N, and a traffic channel data rate, $R_b$, to be allocated for the traffic channel connections;

(d) the base station controller computes a target traffic channel signal-to-noise ratio, $$\text{Traffic}\frac{E_b}{N_t},$$

based on the data rate and the number of traffic channel connections; and (e) the base station controller computes the initial traffic channel transmit power relative to the pilot channel power, $$\frac{TrafficP_{TX}}{PilotP_{TX}},$$

based on estimated forward link channel characteristics, the target traffic channel received signal-to-noise ratio, the base stations' load, the number of traffic channel connections, and the traffic channel data rate.

In one implementation of this method, the base station controller computes the initial traffic channel power as:

$$\frac{TrafficP_{Tx}}{PilotP_{Tx}} = \frac{\text{Traffic}\frac{E_b}{N_t}}{\frac{R_c}{R_b} \cdot \sum_{i=1}^{N} \frac{\frac{PilotE_{c,i}}{I_{or,i}} \cdot \text{Pilot}\frac{E_{c,i}}{I_o}}{\frac{PilotE_{c,i}}{I_{or,i}} - \frac{1}{n} \cdot \text{Pilot}\frac{E_{c,i}}{I_o}}}.$$

A method for forward link power and rate control during hard handoff in a CDMA system is also provided. The method comprises the following steps:

(a) a mobile station searches for pilot signals on a target frequency and reports the strength of the pilot signals above a predetermined threshold to a base station controller, wherein the reported pilot signals form a requested target set;

(b) base stations corresponding to the pilot signals in the requested target set report the current total transmit pilot channel signal-to-noise ratio;

(c) the base station controller sets a tentative granted set equal to the requested target set;

(d) the base station controller sets a target data rate to one in use by a connected service option;

(e) the base station controller sets the required traffic channels total signal-to-noise ratio to a predefined value based on the tentative granted set and the target data rate;

(f) the base station controller computes the required initial traffic channel power based on the tentative target set, the target data rate, the total transmit pilot channel signal-to-noise ratio and the required traffic channels total received signal-to-noise ratio;

(g) the base station controller determines whether a current base station residual capacity is above a desired threshold for the tentative granted set;

(h) if the residual capacity is above the desired threshold, the base station controller sets a granted set equal to the tentative granted set and commands the mobile station to initiate hard handoff; and (i) if the residual capacity is below the desired threshold, the base station controller educes the tentative granted set and the method returns to step (f).

In another embodiment of the present invention, a method for setting the data burst transmission rate on common control channels during soft handoff is provided. The method comprises the following steps:

(a) a base station controller receives a message to be delivered to a mobile station;

(b) the base station controller pages the mobile station on the primary common channels of a set of base stations that are serving the mobile station;

(c) the mobile station reports its current location and the strength of pilot signals above a predetermined threshold to the base station controller, wherein the reported pilot signals form a requested common control channels handoff set;

(d) the base stations corresponding to the pilot signals in the requested target set report the current total transmit pilot channel signal-to-noise ratio to the base station controller;

(e) the base station controller sets a tentative data rate equal to a maximum data rate;

(f) the base station controller sets the required common control channels total signal-to-noise ratio to a predefined value based on the tentative data rate and handoff set size;

(g) the base station controller computes the required common controls channel power based on the tentative data rate, the handoff set size, the total transmit pilot channel signal-to-noise ratio and the required common control channels total received signal-to-noise ratio;

(h) the base station controller determines whether a current base station residual capacity is above a desired threshold for all base stations in the handoff set;

(i) if the residual capacity is above the desired threshold, the base station controller sets a granted data rate equal to the tentative data rate and transmits the message on secondary common control channels of the base station in the handoff set; and (j) if the residual capacity is below the desired threshold, the base station controller sets the tentative data rate to the next lower supported data rate and the method returns to step (g).

Objects and advantages of the present invention include any of the foregoing, taken alone or in combination. Further objects and advantages will be apparent to those of ordinary skill in the art, or will be set forth in the following disclosure.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE PREFERRED EMBODIMENTS

Figure 1:
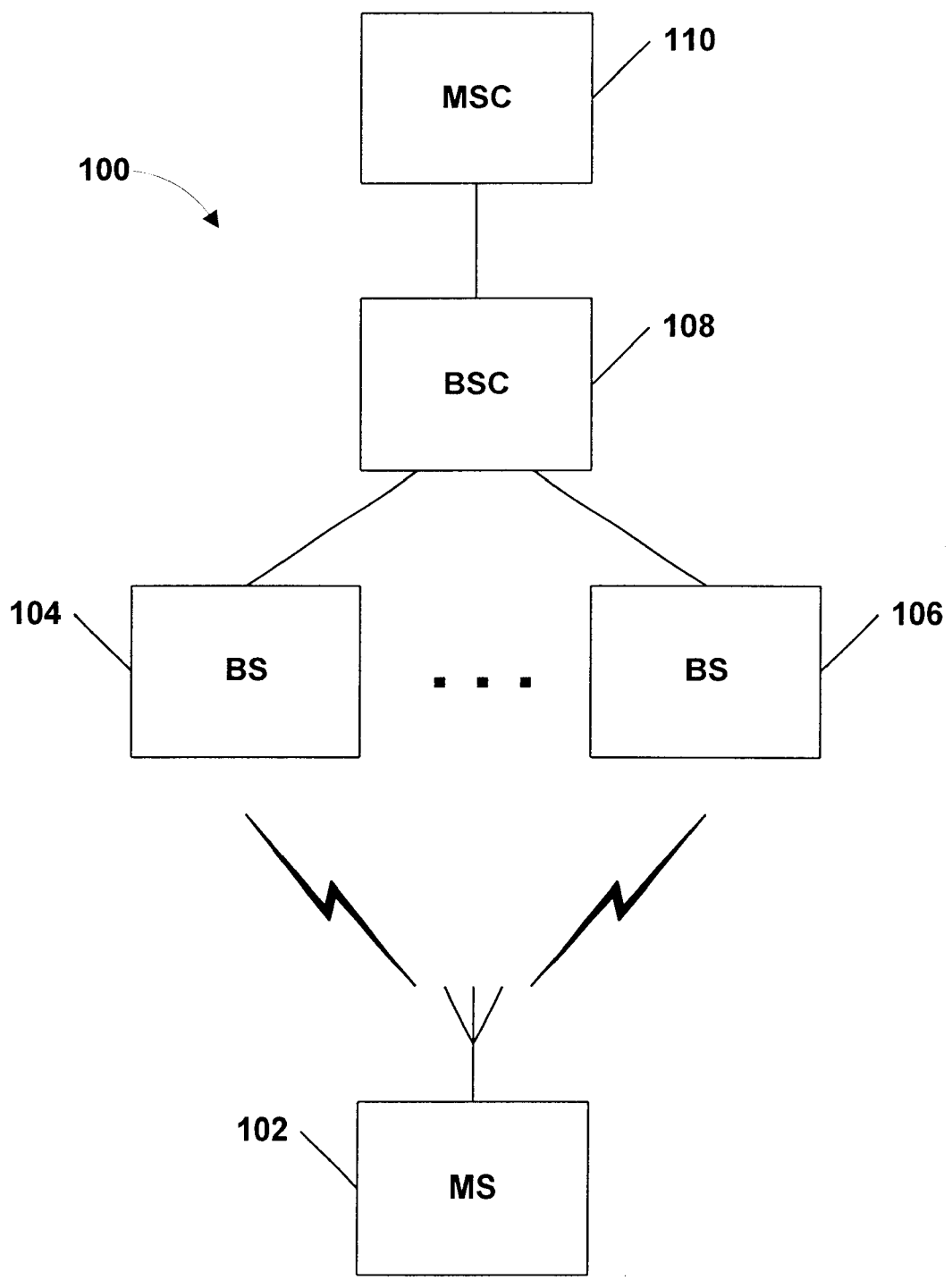
FIG. 1 is a block diagram of a CDMA network according to the present invention.

The architecture of a basic CDMA network 100 is illustrated in FIG. 1. A mobile station (MS) 102 communicates with one of a plurality of base stations (BS) 104 . . . 106 over a standardized air ($U_m$) interface. MS 102 is typically a hand-held portable unit or vehicle-installed unit containing a transceiver, an antenna and control circuitry. Many multiple stations may be in operation within network 100. Each operating mobile station represents the user-side termination of the radio path and allows the user to access network 100. Each base station 104 . . . 106 is located at the center or edge of a coverage region or cell and includes transmitter and receiver antennas mounted on a tower. Network 100 will typically contain hundreds or thousands of base stations. Hence, though only two base stations 104 . . . 106 are illustrated, it should be understood that network 100 may contain any number of base stations. Each base station represents the termination of the radio path with a mobile station on the network-side.

Base station controller (BSC) 108 manages and controls multiple base stations. The base station controller may be at the same location as a base station or may be remotely located. The base station controller communicates with base stations over a standardized $A_{bis}$ interface. Mobile switching center (MSC) 110, in turn, coordinates the activities of all base station controllers in network 100.

The communication path from the base stations to the mobile stations is termed the forward link or downlink, while communication in the mobile station to base station direction is termed the reverse link or uplink. Each forward link CDMA signal includes a pilot channel that allow the mobile stations to make signal strength comparisons between base stations, a synchronization channel that broadcasts synchronization messages to the mobile stations, paging channels for sending control information from the base station to the mobile stations, and multiple traffic channels for transmission of voice and data information. The present invention is directed to the establishment of forward traffic channels between the base stations and mobile stations.

When a forward traffic channel is established, an initial transmit power and data rate must be set. In accordance with the present invention, base station controller 108 implements a forward link open loop power and rate control function. This function may be implemented in any suitable fashion, such as through encoding in a computer microprocessor or software. It utilizes channel measurements made by mobile station 102 and load measurements performed by multiple base stations 104 . . . 106 in order to establish traffic channel connections. The mobile station measurements include the received pilot energy to total interference power spectral density ratio of all detected base stations 104 . . . 106 that are candidates for traffic channel connection establishment. The base station load measurements include the transmit pilot energy to total power spectral density ratio of each of the base stations 104 . . . 106 suggested by mobile station 102 as a candidate for traffic channel establishment.

Figure 2:
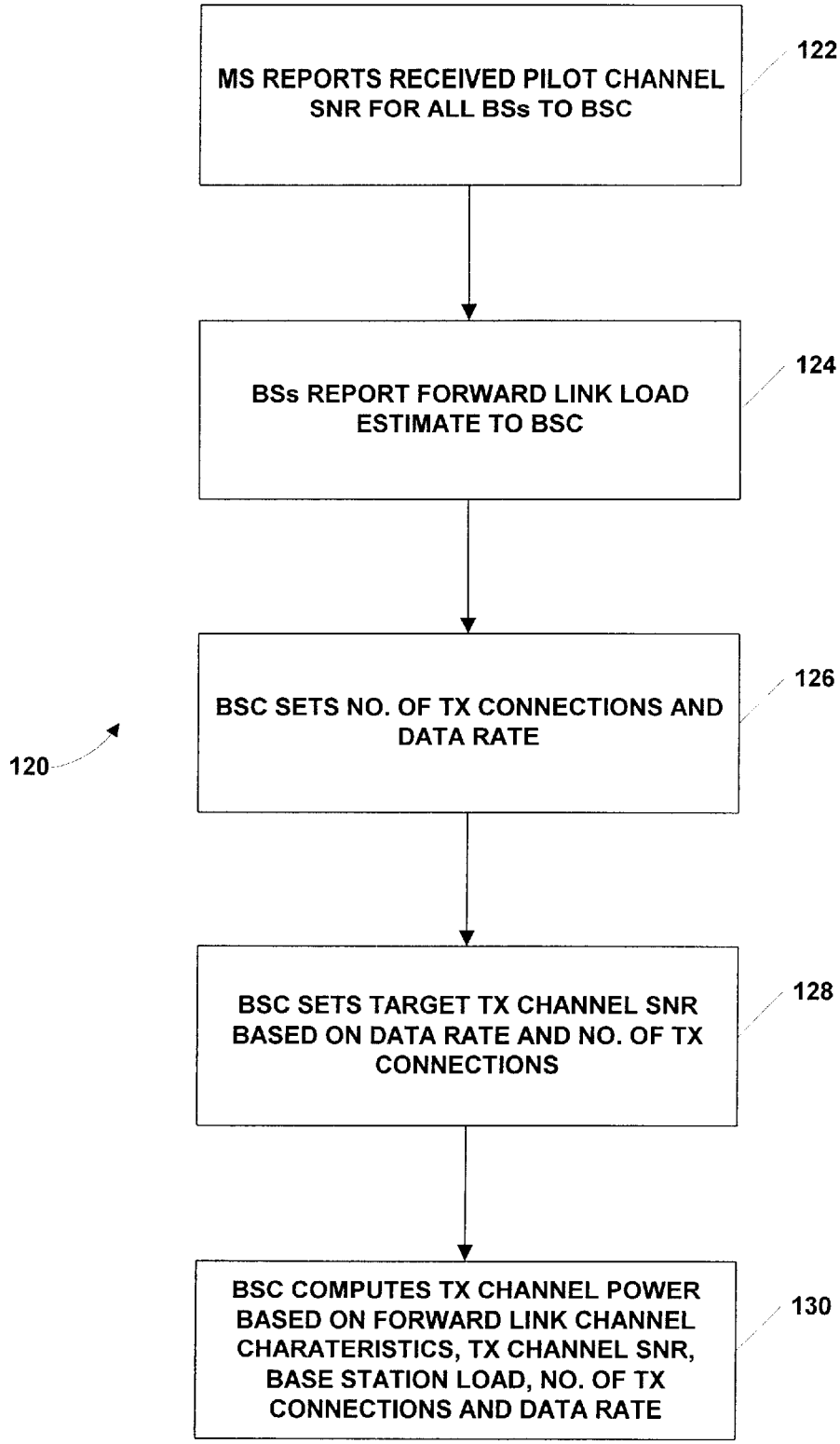
FIG. 2 is a flowchart depicting a method for forward link open loop power and rate control according to the present invention.

FIG. 2 illustrates in general form a method 120 for forward link open loop power and rate control. When base station controller 108 decides that new traffic channel connections should be established, such as during call setup or hard handoff, it requests mobile station 102 to report the received pilot channel signal-to-noise ratio of all base stations 104 . . . 106 in sight (step 122). Alternatively, mobile station 102 may autonomously report such measurements. Base station controller 108 interrogates base stations 104 . . . 106 for the current forward link load estimate (step 124). The admission control function of base station controller 108 decides upon the number of traffic channel connections and the data rate to be allocated for the traffic channel connections (step 126). The target received traffic channel signal-to-noise ratio is selected on the basis of the data rate and the number of connections in soft handoff (step 128). Base station controller 108 computes the required traffic channel power based on the estimated forward link channel characteristics, the target traffic channel received signal-to-noise ratio, the base stations' load, the number of traffic channel connections, and the traffic channel data rate (step 130). The traffic channel power calculated in this manner is used as the initial traffic channel transmit power by all base stations 104 . . . 106 that are to establish the traffic channel connection with mobile station 102.

More particularly, the optimum initial traffic channel transmit power is computed as follows. Base station controller 108 assumes that each forward link channel has n equal strength paths. The received ith pilot chip energy to total power spectral density ratio (reported by the mobile stations in step 122), and the received ith traffic channel bit energy to effective noise power spectral density ratio (set by the base station controller in step 126) are, respectively:

$$\text{Pilot}\frac{E_{c,i}}{I_o} = \frac{\frac{PilotE_{c,i}}{I_{or,i}}}{\frac{\hat{I}_{oc}}{\hat{I}_{or,i}} + \sum_{j=1,j\ne i}^{N}\frac{\hat{I}_{or,j}}{\hat{I}_{or,i}} + 1}, \text{ for } i = 1 \ldots N; \text{ and} \quad \text{(equation 1)}$$

$$\text{Traffic}\frac{E_{b,i}}{N_i} = \frac{\frac{TrafficE_{b,i}}{I_{or,i}}}{\frac{\hat{I}_{oc}}{\hat{I}_{or,i}} + \sum_{j=1,j\ne i}^{N}\frac{\hat{I}_{or,j}}{\hat{I}_{or,i}} + \frac{n-1}{n}}, \text{ for } i = 1 \ldots N. \quad \text{(equation 2)}$$

That is:

$$\text{Traffic}\frac{E_{b,i}}{N_i} = \frac{\frac{TrafficP_{Tx}}{PilotP_{Tx}}\cdot\frac{R_c}{R_b}\cdot\frac{PilotE_{c,i}}{I_{or,i}}}{\frac{PilotE_{c,i}}{I_{or,i}} - \frac{1}{n}} = \quad \text{(equation 3)}$$

$$\frac{\frac{TrafficP_{Tx}}{PilotP_{Tx}}\cdot\frac{R_c}{R_b}\cdot\frac{PilotE_{c,i}}{I_{or,i}}\cdot\text{Pilot}\frac{E_{c,i}}{I_o}}{\frac{PilotE_{c,i}}{I_{or,i}} - \frac{1}{n}\cdot\text{Pilot}\frac{E_{c,i}}{I_o}}.$$

The total received traffic channel bit energy to effective noise power spectral density ratio, then, is:

$$\text{Traffic}\frac{E_b}{N_t} = \frac{TrafficP_{Tx}}{PilotP_{Tx}}\cdot\frac{R_c}{R_b}\cdot\sum_{i=1}^{N}\frac{\frac{PilotE_{c,i}}{I_{or,i}}\cdot\text{Pilot}\frac{E_{c,i}}{I_o}}{\frac{PilotE_{c,i}}{I_{or,i}} - \frac{1}{n}\cdot\text{Pilot}\frac{E_{c,i}}{I_o}}. \quad \text{(equation 4)}$$

Base station controller 108 can solve for the optimum open loop estimate, that is, the initial value of the traffic channel transmit power (step 130), relative to the pilot transmit power:

$$\frac{TrafficP_{Tx}}{PilotP_{Tx}} = \frac{\text{Traffic}\frac{E_b}{N_t}}{\frac{R_c}{R_b}\cdot\sum_{i=1}^{N}\frac{\frac{PilotE_{c,i}}{I_{or,i}}\cdot\text{Pilot}\frac{E_{c,i}}{I_o}}{\frac{PilotE_{c,i}}{I_{or,i}} - \frac{1}{n}\cdot\text{Pilot}\frac{E_{c,i}}{I_o}}}. \quad \text{(equation 5)}$$

The transmit pilot energy to total power spectral density ratio, $$\frac{PilotE_c}{I_{or}},$$

is reported by each base station 104 . . . 106 to base station controller 108. The target base stations received pilot energy to total interference power spectral density ratio, $$\text{Pilot}\frac{E_c}{I_o},$$

are measured by mobile station 102 and reported to the base station by means of signaling. The base station computes the initial traffic channel power, relative to the pilot channel transmit power, $$\frac{\text{Traffic}P_{TX}}{\text{Pilot}P_{TX}},$$

for the desired target $$\text{Traffic}\frac{E_b}{N_t}$$

and the desired traffic channel data rate, using the formulas above.

If the required traffic channel power is such that the residual forward link capacity would decrease below the desired minimum level, the base station may decide to decrease the selected traffic channel data rate and re-compute the required traffic channel transmit power. As an example, the formula above in the case of N=n=1 simplifies to:

$$\frac{\text{Traffic}P_{Tx}}{\text{Pilot}P_{Tx}} = \frac{\text{Traffic}\frac{E_b}{N_t} \cdot \left(\frac{\text{Pilot}E_c}{I_{or}} - \text{Pilot}\frac{E_c}{I_o}\right)}{\frac{R_c}{R_b} \cdot \frac{\text{Pilot}E_c}{I_{or}} \cdot \text{Pilot}\frac{E_c}{I_o}}. \quad \text{(equation 6)}$$

The present invention is applicable to call setup, both in the cases of channel assignment in soft handoff or not, and inter-frequency hard handoff in TIA/EIA-95B compliant systems. In such systems, the Pilot $$\frac{E_c}{I_o}$$

measurement reported by mobile station 102 is reported to the base station by means of the ACTIVE_PILOT_STRENGTH and PILOT_STRENGTH fields of the Origination Message, Page Response Message, and Candidate Frequency Report Message. The present invention is also applicable to IS-2000 systems to select the initial transmit power and data rate of the forward link common control channels, both when operated in soft handoff or not.

Figure 3:
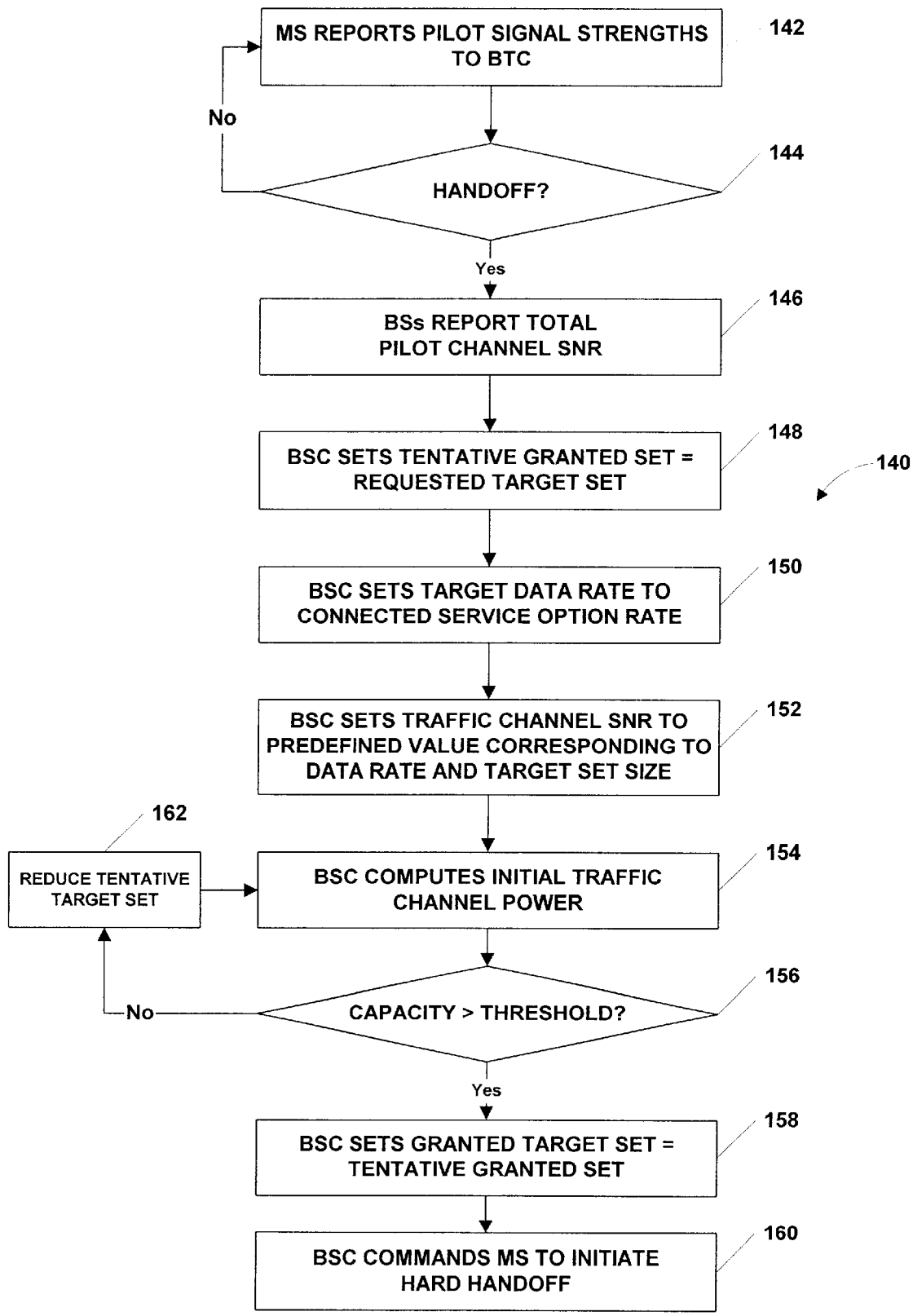
FIG. 3 is a flowchart depicting a method for power and data rate control during hard handoff according to the present invention.

FIG. 3 illustrates a method 140 implementing the procedures described above for setting the initial transmit power and data rate in a hard handoff situation. Hard handoff may be necessary when two base stations are not synchronized or are using different frequency bands. In step 142, the mobile station periodically searches for pilot signals on the target frequency and reports the strength of the pilot signals that are above a predetermined threshold to base station controller 108. These reported pilot signals form the requested target set of base stations. At decision node 144, base station controller 108 determines whether a handoff is necessary. If handoff is not necessary, the method returns to step 142. If handoff is necessary, base station controller 108 queries each base station 104 . . . 106 corresponding to the pilot signals in the requested set for the current transmit pilot channel energy to total power spectral density ratio $$\frac{\text{Pilot}E_c}{I_{or}},$$

(step 146).

Next, base station controller 108 sets the tentative granted set (the number of traffic channel connections) equal to the requested target set (step 148) and sets the target data rate equal to the one in use by the connected service option (step 150). In step 152, base station controller 108 sets the required target traffic channels total received signal-to-noise ratio, $$\text{Traffic}\frac{E_b}{N_t},$$

to a predefined value corresponding to the data rate of the connected voice service option and tentative target set size (number of traffic channel connections). The current total received $$\text{Traffic}\frac{E_b}{N_t}$$

of the source active set, which is known to base station controller 108, may also be used to estimate the required $$\text{Traffic}\frac{E_b}{N_t}$$

of the target active set.

In step 154, base station controller 108 computes the required initial traffic channel power for the tentative target set, target data rate, total pilot channel transmit energy to total power spectral density ratio $$\frac{\text{Pilot}E_c}{I_{or}},$$

and the required traffic channel total received signal-to-noise ratio $$\text{Traffic}\frac{E_b}{N_t},$$

in accordance with the formulae set forth above (initial power computed using equation 5). Next, base station controller 108 determines whether the current base station residual capacity, adjusted to consider the additional links to be set up each with power allocation as computed above, is above the desired threshold for all of the base stations in the tentative target set (decision node 156). If the residual capacity is above this desired threshold for the tentative target set, base station controller sets the granted set equal to the tentative granted set (step 158) and commands mobile station 102 to initiate hard handoff to the granted target set (step 160). If the residual capacity is below the desired threshold for the tentative target set, base station controller 108 prunes the tentative granted set (number of traffic channel connections) (step 162), and then repeats the computations in step 154.

Figure 4:
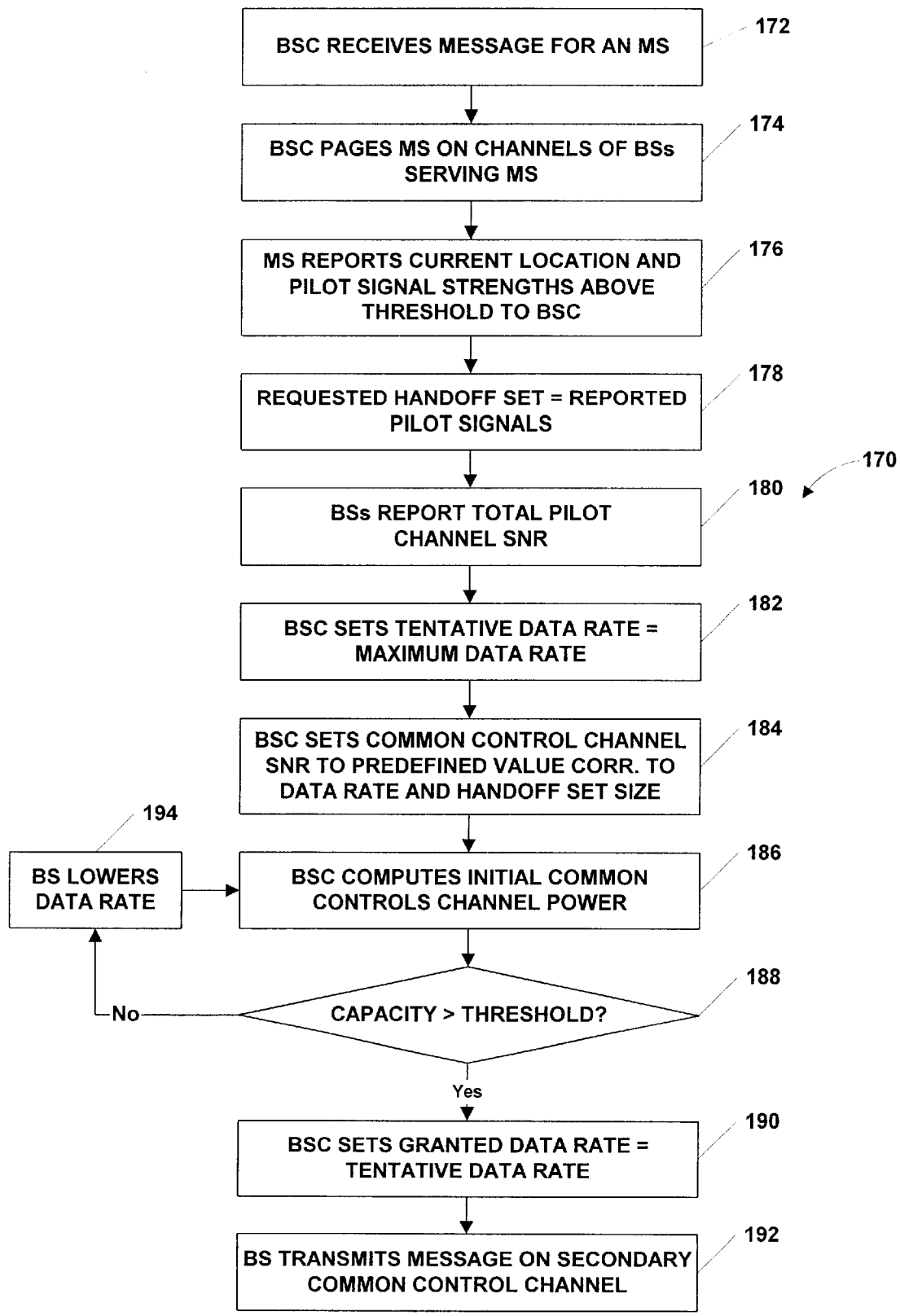
FIG. 4 is a flowchart depicting a method for data burst transmission rate control during soft handoff according to the present invention.

FIG. 4 illustrates a method 170 implementing the procedures described above for setting the data burst transmission rate on common control channels in a soft handoff situation. In step 172, the base station controller receives a message to be delivered to the mobile station. The base station controller pages the mobile station, in step 174, on the primary common channels of a set of base stations that presumably are serving the mobile station. In step 176, the mobile station responds informing the base station controller of its current location and of the strength of the pilot signals that are detected above a predetermined threshold. These reported pilot signals form the requested common control channels handoff set (step 178). Next, base station controller 108 queries each base station 104... 106 corresponding to a pilot signal in the requested handoff set for the current pilot channel transmit energy to total power spectral density ratio, $$\frac{PilotE_c}{I_{or}}$$

(step 180).

In step 182, base station controller 108 sets the tentative data rate equal to the maximum data rate and, in step 184, sets the required common controls channel total received signal-to-noise ratio, $$\frac{E_b}{N_t},$$

a predefined value corresponding to the tentative data rate and handoff set size. The base station controller then computes the required common controls channel power for the tentative data rate, handoff set, pilot channel transmit energy to total power spectral density ratio $$\frac{PilotE_c}{I_{or}},$$

and the required common controls channel total received signal-to-noise ratio $$\frac{E_b}{N_t},$$

in accordance with the formulae set forth above (step 186).

Next, base station controller 108 determines whether the current base station residual capacity, adjusted to consider the additional links to be set up each with power allocation as computed above, is above the desired threshold for all of the base stations in the handoff set (decision node 188). If the residual capacity is above this desired threshold for the tentative handoff set, base station controller sets the granted data rate equal to the tentative data rate (step 190) and transmits the message on the secondary common control channels of the base station in the handoff set (step 192). If the residual capacity is below the desired threshold for one or more of the base stations in the handoff set, base station controller 108 sets the tentative data rate to the next lower supported data rate (step 162), and then repeats the computations in step 186.

While various embodiments of the present invention have been described above, it should be understood that these embodiments have been presented by way of example only, and not limitation. The breadth and scope of the present invention is not limited to any of the described embodiments, but rather, is defined in accordance with the following claims and their equivalents.

What is claimed is:

1. A CDMA wireless communications system that controls the initial power and data rate settings during forward link establishment of a traffic channel comprising:
   a base station controller;
   one or more base stations that report a current forward link load estimate to the base station controller; and
   a mobile station that reports a received pilot channel signal-to-noise ratio to the base station controller,
   wherein the base station controller sets the number of traffic channel connections and the data rate to be allocated for the traffic channel connections, computes a target traffic channel signal-to-noise ratio based on the data rate and the number of traffic channel connections, and computes the initial traffic channel power based on estimated forward link channel characteristics, the target traffic channel received signal-to-noise ratio, the base stations' load, the number of traffic channel connections, and the traffic channel data rate.

2. In a CDMA wireless communications system having a base station controller, one or more base stations, and a mobile station, a method for forward link open loop power and rate control comprising the following steps:
   (a) the mobile station reports a received pilot channel signal-to-noise ratio for all base stations in sight to the base station controller;
   (b) the base stations report a current forward link load estimate to the base station controller;
   (c) the base station controller sets a number of traffic channel connections and a traffic channel data rate to be allocated for the traffic channel connections;
   (d) the base station controller computes a target traffic channel signal-to-noise ratio based on the data rate and the number of traffic channel connections; and
   (e) the base station controller computes the initial traffic channel power based on estimated forward link channel characteristics, the target traffic channel received signal-to-noise ratio, the base stations' load, the number of traffic channel connections, and the traffic channel data rate.

3. A method as claimed in claim 2, wherein in step (a), the base station controller first requests the mobile station to report the received pilot channel signal-to-noise ratio.

4. A method as claimed in claim 2, wherein in step (a), the mobile station autonomously reports the received pilot channel signal-to-noise ratio to the base station controller.

5. A method as claimed in claim 2, wherein in step (b), the base station controller interrogates the base stations for the current forward link load estimate.

6. A method as claimed in claim 2, wherein in step (e), the base station controller computes the initial traffic channel power as:

$$\frac{TrafficP_{Tx}}{PilotP_{Tx}} = \frac{Traffic\frac{E_b}{N_t}}{\frac{R_c}{R_b} \cdot \sum_{i=1}^{N} \frac{\frac{PilotE_{c,i}}{I_{or,i}} \cdot Pilot\frac{E_{c,i}}{I_o}}{\frac{PilotE_{c,i}}{I_{or,i}} - \frac{1}{n} \cdot Pilot\frac{E_{c,i}}{I_o}}}.$$

7. In a CDMA wireless communications system having a base station controller, one or more base stations, and a mobile station, a method for forward link power and rate control during hard handoff comprising the following steps:
   (a) the mobile station searches for pilot signals on a target frequency and reports the strength of the pilot signals above a predetermined threshold to the base station controller, wherein the reported pilot signals form a requested target set;

(b) the base stations corresponding to the pilot signals in the requested target set report the current total transmit pilot channel signal-to-noise ratio;

(c) the base station controller sets a tentative granted set equal to the requested target set;

(d) the base station controller sets a target data rate to one in use by a connected service option;

(e) the base station controller sets the required traffic channels total signal-to-noise ratio to a predefined value based on the tentative granted set and the target data rate;

(f) the base station controller computes the required initial traffic channel power based on the tentative target set, the target data rate, the total transmit pilot channel signal-to-noise ratio and the required traffic channels total received signal-to-noise ratio;

(g) the base station controller determines whether a current base station residual capacity is above a desired threshold for the tentative granted set;

(h) if the residual capacity is above the desired threshold, the base station controller sets a granted set equal to the tentative granted set and commands the mobile station to initiate hard handoff; and (i) if the residual capacity is below the desired threshold, the base station controller reduces the tentative granted set and the method returns to step (f).

8. A method as claimed in claim 7, wherein in step (b), the base station controller queries each base station for the current total transmit pilot channel signal-to-noise ratio.

9. A method as claimed in claim 7, wherein in step (f), the initial traffic channel power is computed as:

$$\frac{TrafficP_{Tx}}{PilotP_{Tx}} = \frac{Traffic\frac{E_b}{N_t}}{\frac{R_c}{R_b} \cdot \sum_{i=1}^{N} \frac{\frac{PilotE_{c,i}}{I_{or,i}} \cdot Pilot\frac{E_{c,i}}{I_o}}{\frac{PilotE_{c,i}}{I_{or,i}} - \frac{1}{n} \cdot Pilot\frac{E_{c,i}}{I_o}}}.$$

10. In a CDMA wireless communications system having a base station controller, one or more base stations, and a mobile station, a method for setting the data burst transmission rate on common control channels during soft handoff comprising the following steps:

(a) the base station controller receives a message to be delivered to the mobile station;

(b) the base station controller pages the mobile station on the primary common channels of a set of base stations that are serving the mobile station;

(c) the mobile station reports its current location and the strength of pilot signals above a predetermined threshold to the base station controller, wherein the reported pilot signals form a requested common control channels handoff set;

(d) the base stations corresponding to the pilot signals in the requested target set report the current total transmit pilot channel signal-to-noise ratio to the base station controller;

(e) the base station controller sets a tentative data rate equal to a maximum data rate;

(f) the base station controller sets the required common control channels total signal-to-noise ratio to a predefined value based on the tentative data rate and handoff set size;

(g) the base station controller computes the required common controls channel power based on the tentative data rate, the handoff set, the total transmit pilot channel signal-to-noise ratio and the required common control channels total received signal-to-noise ratio;

(h) the base station controller determines whether a current base station residual capacity is above a desired threshold for all base stations in the handoff set;

(i) if the residual capacity is above the desired threshold, the base station controller sets a granted data rate equal to the tentative data rate and transmits the message on secondary common control channels of the base station in the handoff set; and (j) if the residual capacity is below the desired threshold, the base station controller sets the tentative data rate to the next lower supported data rate and the method returns to step (g).

11. A method as claimed in claim 10, wherein in step (d), the base station controller queries each base station for the current total transmit pilot channel signal-to-noise ratio.

12. A method as claimed in claim 10, wherein in step (g), the initial traffic channel power is computed as:

$$\frac{TrafficP_{Tx}}{PilotP_{Tx}} = \frac{Traffic\frac{E_b}{N_t}}{\frac{R_c}{R_b} \cdot \sum_{i=1}^{N} \frac{\frac{PilotE_{c,i}}{I_{or,i}} \cdot Pilot\frac{E_{c,i}}{I_o}}{\frac{PilotE_{c,i}}{I_{or,i}} - \frac{1}{n} \cdot Pilot\frac{E_{c,i}}{I_o}}}.$$

* * * * *